US010788382B2

(12) United States Patent
Thomson

(10) Patent No.: US 10,788,382 B2

(45) Date of Patent: Sep. 29, 2020

(54) METHOD AND DATA PROCESSING DEVICE FOR DETECTING A LOAD DISTRIBUTION IN A ROLLER BEARING

(71) Applicant: Aktiebolaget SKF, Gothenburg (SE)

(72) Inventor: Allan Thomson, Lanark (GB)

(73) Assignee: Aktiebolaget SKF, Gothenburg (SE)

( * ) Notice: Subject to any disclaimer, the term of this patent is extended or adjusted under 35 U.S.C. 154(b) by 555 days.

(21) Appl. No.: 14/879,166

(22) Filed: Oct. 9, 2015

(65) Prior Publication Data

US 2016/0103028 A1 Apr. 14, 2016

(30) Foreign Application Priority Data

Oct. 13, 2014 (GB) .................................. 1418058.2

(51) Int. Cl.

*G01L 5/00* (2006.01)
*G01M 13/045* (2019.01)
*G01M 13/04* (2019.01)

(52) U.S. Cl.

CPC .......... *G01L 5/0019* (2013.01); *G01M 13/04* (2013.01); *G01M 13/045* (2013.01)

(58) Field of Classification Search

CPC ......... G01M 13/04; G01L 5/0019; G01B 7/14
USPC ...................................... 702/33–34, 42, 158
See application file for complete search history.

(56) References Cited

U.S. PATENT DOCUMENTS 4,054,999 A * 10/1977 Harbottle ............. F16C 19/364 29/407.06
5,952,587 A 9/1999 Rhodes et al.
6,526,829 B1 3/2003 Lysen et al.
7,716,018 B2 * 5/2010 Pecher ................. G01L 5/0019 702/190
2001/0052854 A1 12/2001 Brown
2004/0199368 A1 * 10/2004 Bechhoefer ........... G01H 1/003 703/7
2004/0251916 A1 12/2004 Kirzhner
2007/0074587 A1 5/2007 Mol et al.
2008/0095483 A1 * 4/2008 Duret ................... F16C 19/522 384/448
2008/0234964 A1 9/2008 Miyasaka et al.
2009/0289832 A1 11/2009 Evers
2011/0125419 A1 * 5/2011 Bechhoefer ............ F03D 7/047 702/34
2012/0020603 A1 * 1/2012 Stubenrauch ......... F16C 41/008 384/448

(Continued)

FOREIGN PATENT DOCUMENTS

CN 1401971 A 3/2003
CN 101198480 A 6/2008

(Continued)

*Primary Examiner* — Eman A Alkafawi

(74) *Attorney, Agent, or Firm* — Garcia-Zamor Intellectual Property Law; Ruy Garcia-Zamor; Bryan Peckjian

(57) ABSTRACT

A method for detecting a load distribution in a roller bearing having at least one row of rollers and a strain sensor attached to a first ring, wherein the first ring is configured to rotate relative to a second ring. The method comprises steps of: (a) detecting peak heights and peak positions in roller load induced strain signals obtained from the strain sensor, and (b) calculating a load acting on at least one angle range of the second ring using peak heights of a plurality of peak positions falling in the angle range.

11 Claims, 9 Drawing Sheets

18
10
12
16
14
20

(56) References Cited

U.S. PATENT DOCUMENTS

| | | | | |
|---|---|---|---|---|
| 2013/0233081 | A1* | 9/2013 | Zhu | G01N 29/043 73/632 |
| 2013/0322801 | A1* | 12/2013 | Den Haak | G01L 5/0009 384/448 |
| 2014/0324367 | A1* | 10/2014 | Garvey, III | G01D 18/00 702/56 |
| 2014/0333070 | A1 | 11/2014 | Van Der Ham | |
| 2016/0103037 | A1 | 4/2016 | Thomson | |
| 2016/0187226 | A1* | 6/2016 | Tsutsui | G01M 13/045 73/593 |

FOREIGN PATENT DOCUMENTS

| | | | |
|---|---|---|---|
| CN | 201476912 | U | 5/2010 |
| CN | 102410308 | A | 4/2012 |
| CN | 103502785 | A | 8/2014 |
| CN | 107367238 | A | 11/2017 |
| GB | 2228088 | A | 8/1990 |
| JP | S63081208 | A | 4/1988 |
| RU | 2432560 | C1 | 10/2011 |
| WO | 2014/090305 | A1 | 6/2014 |

* cited by examiner

METHOD AND DATA PROCESSING DEVICE FOR DETECTING A LOAD DISTRIBUTION IN A ROLLER BEARING

CROSS REFERENCE TO RELATED APPLICATION

This is a Non-Provisional Patent Application, filed under the Paris Convention, claiming the benefit of Great Britain (GB) Patent Application Number 1418058.2, filed on 13 Oct. 2014 (13.10.2014), which is incorporated herein by reference in its entirety.

FIELD OF THE INVENTION

The invention relates to a method and a data processing device for detecting a load distribution in a roller bearing and to a roller bearing equipped with such a data processing device.

TECHNICAL BACKGROUND

A reliable detection of load distributions in a roller bearing is important for various purposes including controlling the machine in which the bearing is operating, adapting and creating maintenance schedules for the bearing etc. This holds in particular for bearings which operate in very complex machines where bearing failure has to be avoided. In large-sized roller bearings such as bearings for use in wind turbines, bearing load detection may be valuable for the purpose of remote control and monitoring.

SUMMARY OF THE INVENTION

It is an object of the invention to provide a method and a data processing device capable of reliably detecting a load acting on at least one angle range of a bearing other than the ring equipped with a strain sensor in the range.

The invention starts from a method for detecting a load distribution in a roller bearing having at least one row of rollers and a strain sensor attached to a first ring. The first ring is configured to rotate relative to a second ring.

It is proposed that the method comprises the steps of detecting peak heights and peak positions in roller load induced strain signals obtained from the strain sensor and of calculating a load acting on a least one angle range of the second ring using peak heights of a plurality of peak positions falling in the angle range. The rotating first ring including the strain sensor attached sweeps over the circumference of the second ring and probes the load transferred via the rollers arranged between the first ring and the second ring when these pass by the sensor. When mapping the positions and heights of the peaks and the signal resulting from the passing rollers onto the angle position in the reference system of the first ring, the load can be probed in a plurality of points changing over the time. After having sampled a sufficient number of peak heights in various measuring points on the sector corresponding to the angle range, it is possible to reliably detect the load acting on that sector in the time period corresponding to the measuring time.

Here and in the following, the expression "roller" shall include any kind of rolling element, in particular cylindrical rollers, tapered rollers or toroidal rollers as well as balls. The invention is applicable to various kinds of bearings including single row bearings or double row bearings.

Further, it is proposed that the step of calculating a load acting on the first angle range includes calculating a median value of the peak heights in this angle range. It has turned out that the median value is sufficiently immune to the occasional perceived higher or lower amplitudes of roller loads caused by increased and decreased spacings respectively and/or in the case of surface wireless sensors (SWS) or portable wireless sensors (PWS) to roller skewing effects.

According to a further aspect of the invention, it is proposed that the method includes the step of outputting an array containing the median values calculated for each of the sectors of the second ring.

Preferably, the load values are calculated for a plurality of sectors of equal size covering the entire circumference of the second ring. In a preferred embodiment of the invention, the load values are calculated for eight sectors of 45 degrees each.

In a preferred embodiment of the invention, the method includes the step of high-pass or band pass filtering the strain signal; determining the zero crossings of the filtered strain signal; determining a peak position as a midpoint between adjacent zero crossings of the strain signals and determining a peak height using the roller induced strain signal at the peak position. The inventors have found that determining the peak position in this way rather than as the position of the local maximum of the signal leads to more reliable results. The peak height can be determined by using a local average over the signal centered on the peak position as defined above.

Further, it is proposed that the method further includes the steps of determining trough depths and trough positions of troughs in the strain signal; comparing the peak heights and trough depths with predetermined threshold values respectively and disregarding the peak heights in the steps of determining the load distribution when the pertinent peak height and the trough depth between a peak and its neighboring peak are below a respective threshold value. This avoids that double peaks or other artifacts are erroneously identified as signals resulting from passing rollers by making sure that the peaks will be separated clearly by a sufficiently deep trough.

Further, it is proposed that the method comprises the step of determining the slope of a linear function connecting the zero crossing point and the peak height of a peak following the zero crossing point and discarding the peak for the purpose of determining the load position if the slope falls short of a predetermined minimum slope. In addition or instead of checking the slope between the peak and its preceding zero crossing, it is of course possible to check the slope between a peak and the zero crossing following the peak and/or a slope between a zero crossing and a trough following or preceding the zero crossing.

Further, it is proposed that the method comprises the step of mapping the roller load induced strain signals onto angle dependent signals relating to angular positions in the reference system of the second (static) ring. It has turned out that using angle positions rather than absolute positions in units of length on a raceway can avoid confusion and errors.

A further aspect of the invention relates to a data processing device including at least one interface for receiving roller load induced strain signals from a strain sensor, wherein the data processing device implements the method as described above. Preferably, the data processing device is provided with a wireless transmitter configured to be attached to a roller bearing such that the roller loads can be transmitted in a wireless way.

A further aspect of the invention relates to a roller bearing equipped one strain sensor for capturing roller load induced strain signals and with a data processing device as described above.

The above embodiments of the invention as well as the appended claims and figures show multiple characterizing features of the invention in specific combinations. The skilled person will easily be able to consider further combinations or sub-combinations of these features in order to adapt the invention as defined in the claims to his or her specific needs.

DETAILED DESCRIPTION OF THE EMBODIMENTS

Figure 1:
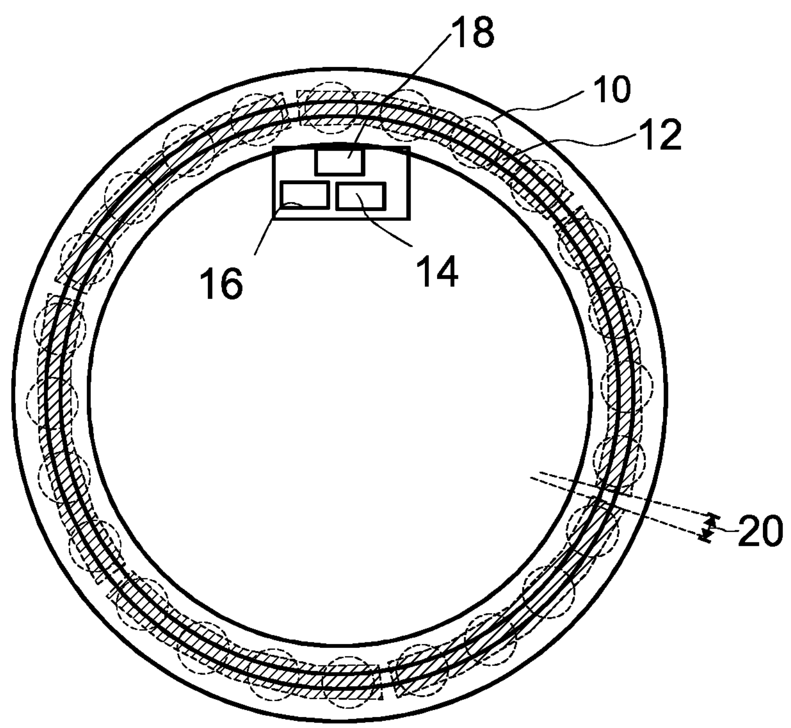
FIG. 1 is a schematic representation a roller bearing including a strain sensor for measuring strains created by passing rollers arranged in a cage and a data processing device according to the invention.

FIG. 1 is a schematic representation of the roller bearing including 24 rollers 10 arranged in 6 cages 12, wherein each of the cages 12 holds four rollers 10. A strain sensor 14 is attached to or embedded into an inner ring of the bearing and connected to the input of a data processing device 16 formed as a microcontroller.

The invention is applicable to configurations with more than one sensor, in particular with three or four sensors arranged on the inner ring or to applications where the sensor 14 is mounted on the outer ring.

The microcontroller is configured to drive a wireless transmitter mounted in the same electronics pack. Preferably, the electronics pack includes a power harvesting means (not illustrated) for generating power from the rotation of the bearing.

The six cages 12 of the bearing are designed so as to be arranged with a predetermined spacing or gap 20 in between each pair of adjacent cages 12. The distribution of the gaps 20 is subject to dynamical changes depending on friction, load, vibrations or other parameters. If the gaps 20 are equally distributed, i.e. when the gaps between each pair of adjacent cages 12 have equal width, the spacing between each pair of adjacent rollers 10 is equal as well and corresponds to a nominal spacing, i.e. the rollers 10 are homogenously distributed over the circumference of the inner ring.

In case where the cages 12 are distributed such that there is only one large gap 20, whereas the other gaps are closed because the cages 12 are in contact with each other, the roller spacing between the rollers 10 left and right from the large gap 20 is larger than the nominal spacing, whereas the roller spacings between neighboring rollers 10 held by different cages 12 contacting each other is smaller than the nominal spacing. The latter extreme cases for the spacings are minimum and maximum spacings for the case of healthy cages 12 which are not broken. The presence of spacings above or below these values indicates that there is a broken cage or broken or missing roller.

According to one aspect of the invention, the spacings, i.e. the distance between the centers of neighboring rollers 10, are detected for the purpose of checking the integrity of the cages 12.

However, the occurrence of very large or very small spacings is a sufficient but not a necessary condition for the existence of a damaged cage 12. Even if the cage 12 is damaged, the rollers 10 may distribute in a perfectly homogeneous way by chance.

The strain sensor 14 is configured to measure strain induced by passing rollers 10. The signal generated by the strain sensors 14 will be called roller load induced strain signal or RLIS signal here and in the following. The signal has basically two characteristic periods or frequencies, one corresponding to the delay between rollers 10 passing by the sensor and the other period corresponding to the time interval in which all of the rollers in a row, i.e. the entire train of rollers and cage segments, will pass the sensor 14. The latter time interval is also referred to as the fundamental train period. Both periods or the pertinent frequencies depend on whether the sensor 14 is mounted on the outer ring or on the inner ring.

In order to reliably detect cage integrity, it is necessary to have a signal covering multiple cycles of rotation of the cages 12 with respect to the inner ring. As the cages 12 rotate with roughly half the speed of the outer ring, this means that a signal sample for use in the roller spacing algorithm for checking the cage integrity should include approximately six or more shaft rotations.

Figure 2A:
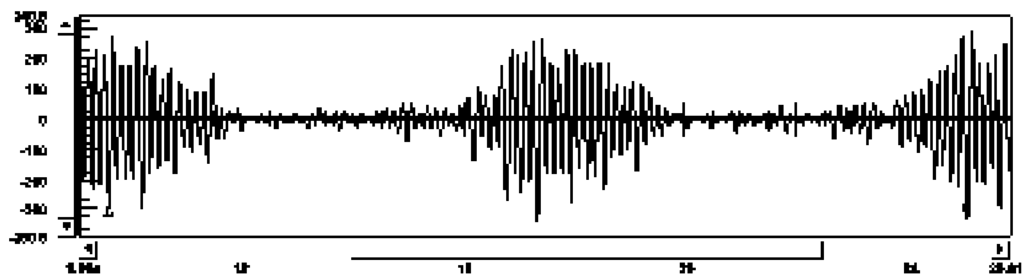
FIGS. 2*a* and 2*b* are schematic representations of possible strain signals to be interpreted by the method according to the invention.
Figure 2B:
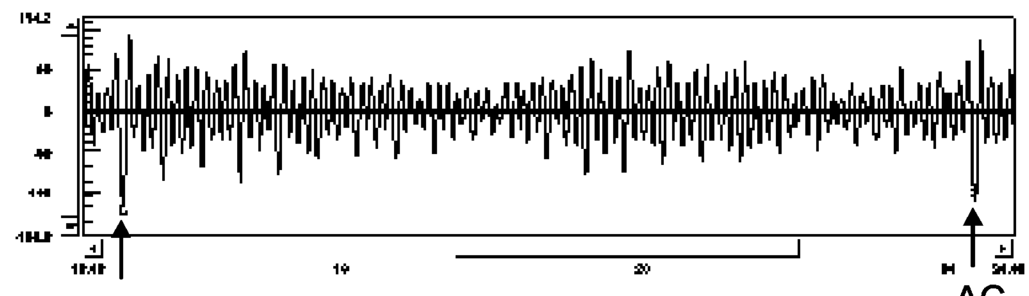

FIGS. 2*a* and 2*b* are schematic representations of possible strain signals to be interpreted by the method according to the invention.

The uppermost graph in FIG. 2*a* shows that the amplitude of the signal may be varying as a consequence of significant load variations.

FIG. 2*b* illustrates an example with one accumulated clearance AC or gap at a position indicated with an arrow. The spacing between two consecutive peaks of the signal is wider than the spacing between other peaks.

In FIGS. 2*a* and 2*b* as well as in the following graphs showing sensor signals, the signal is preprocessed using a band-pass high pass filter filtering out DC offsets and frequency components far below the roller pass frequency. The band pass filter should be as narrow as possible to avoid distortions but wide enough to include the roller pass frequency and at least some harmonics thereof. This is an important point for the invention because it makes sure that the signal is oscillating in a more or less symmetric way around zero. Further, the horizontal axis in FIGS. 2*a* and 2*b* as well as in the following figures is an angle of rotation and the vertical axis represents the signal strength in arbitrary units.

Figure 3A:
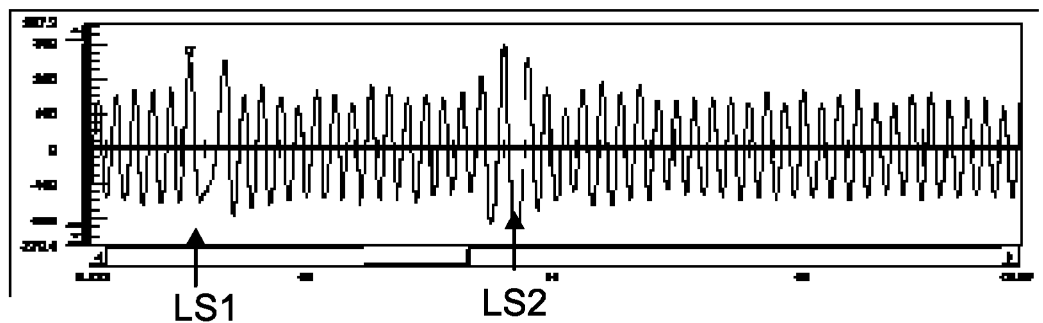
FIGS. 3*a* and 3*b* are further schematic representations of graphs showing possible strain signals to be interpreted by the method according to the invention.
Figure 3B:
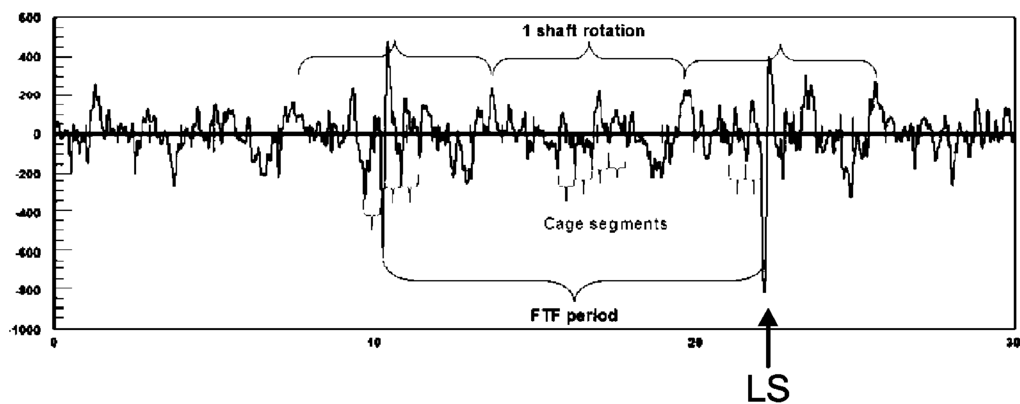

FIGS. 3*a* and 3*b* are further schematic representations of graphs showing possible strain signals to be interpreted by the method according to the invention.

The signal of FIG. 3*a* shows a large spacing LS1 due to a missing roller as well as some naturally occurring larger spacings LS2.

FIG. 3*b* shows a very noisy signal wherein a large accumulated spacing LS exceeding the tolerance for heathy cage integrity can still be observed.

Figure 4A:
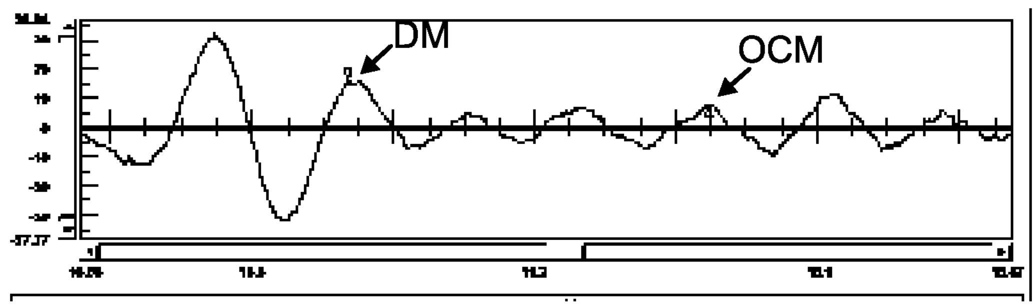
FIGS. 4*a* and 4*b* are further schematic representations of graphs showing possible strain signals to be interpreted by the method according to the invention.
Figure 4B:
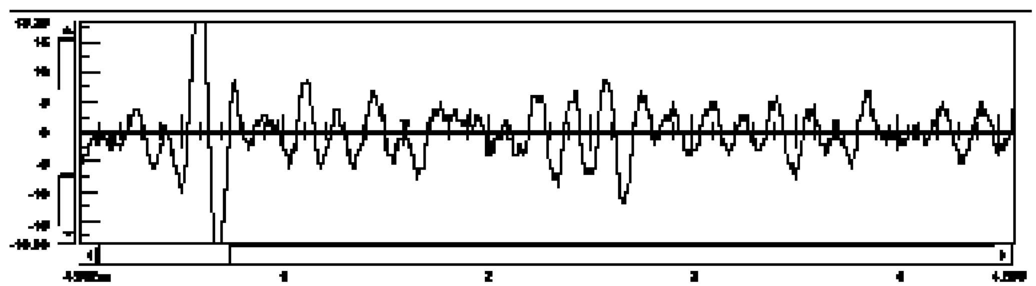

Further schematic representations of graphs showing possible strain signals to be interpreted by the invention are illustrated in FIGS. 4*a* and 4*b*. As illustrated in FIG. 4*a*, the maxima of the strain signals can assume various shapes including double maxima DM and offset center maxima OCM such that it is immediately clear that the position of the maximum is eventually shifted from the position of the roller center.

Further, as shown in FIG. 4*b*, the signals pertaining to some of the peaks do not cross the zero line, whereas the signals belonging to other peaks cross the zero line several times. This is likely to happen in low roller load conditions or in other cases with high signal-to noise ratio.

One of the challenges of the invention is to provide a method which reliably extracts valuable information from the signals illustrated in FIGS. 2 through 4.

Figure 5:
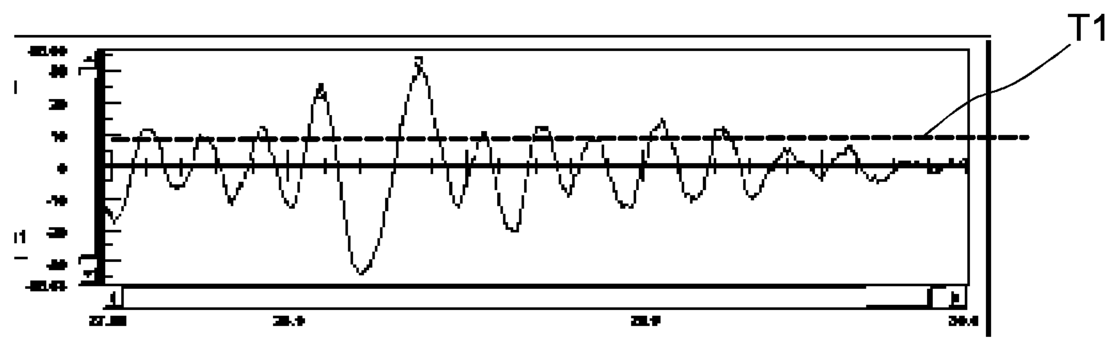
FIG. 5 is a schematic representations of graph showing a strain signal, wherein some zero crossings and peaks are highlighted.

FIG. 5 is a schematic representation of a graph showing a strain signal, wherein some zero crossings Z1 through Z4 and peaks P3, P4 are highlighted. The invention proposes to reduce the amount of error by selecting the zero crossings on either side of a ball-pass frequency peak and to determine the roller center to be the midpoint between the two zero crossings.

However, the signal-to-noise ratio increases visibly on the right hand side in FIG. 5 and the evaluation of these peaks for the purpose of determining the roller centers would obviously not lead to reliable results. As a rule, the signal-to-noise ratio in a range between one half of the fundamental ball pass frequency and twice the fundamental ball pass frequency should be above 60%.

The invention therefore proposes to apply a threshold value T1 as illustrated in a dashed line in FIG. 5 to the peak heights and to consider only those peaks valid for which the peak height is above the threshold value T1.

Figure 6A:
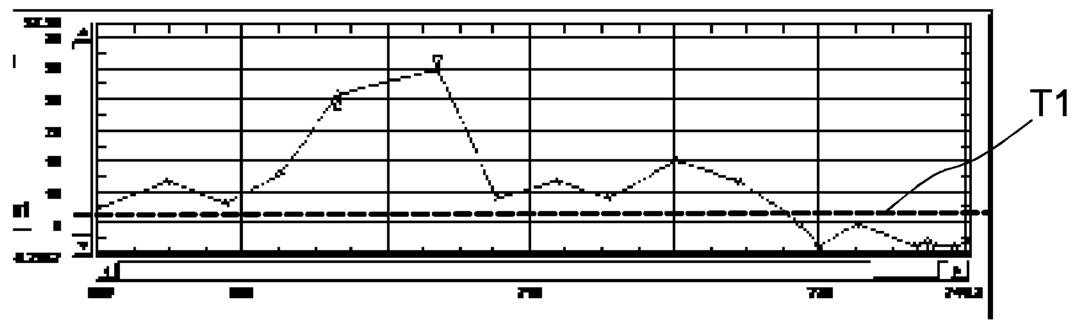
FIGS. 6*a* and 6*b* are graphs showing peak centre amplitudes and roller spacings derived from the peak centre amplitudes.
Figure 6B:
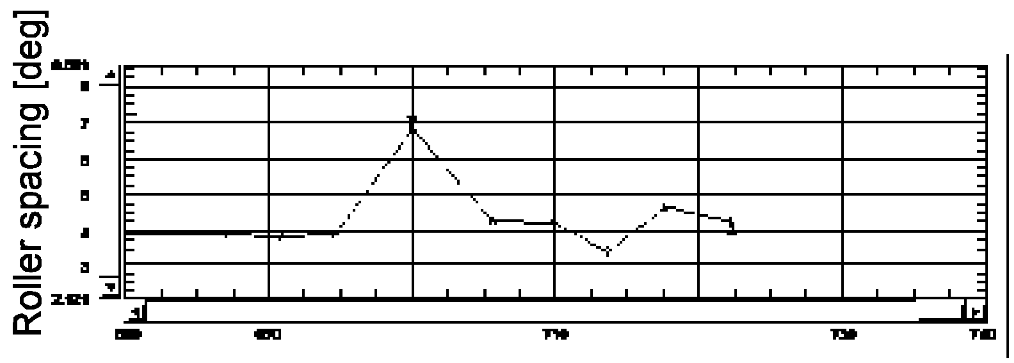

FIG. 6*a* illustrates the peak center amplitudes, which can be the signal value at the peak position or be computed based on some sort of running average around the previously calculated roller center position and FIG. 6*b* illustrates a roller spacing calculated based on these peaks. The peaks on the right hand side of the graph fall short of the threshold value and are not used for the calculation of roller spacings in FIG. 6*b*.

FIG. 6*b* shows the roller spacings defined as the difference of adjacent valid peak positions derived as explained above from the data of FIG. 6*a*.

Though not illustrated, a calculation similar to the assessment of the peak heights according to FIG. 6*a* can be done for the trough depths, i.e. the depth of the negative peaks between each pair of two positive peaks. The invention proposes to apply a threshold value to these trough depths as well and to use only those peaks for the assessment of the roller spacings which are clearly separated by a trough with a sufficient depth. The second criterion makes sure that the slope of the signals is sufficiently steep at the zero crossings so as to avoid peaks with multiple zero crossings.

In most of the cases, suitably chosen threshold values for the peak heights and the trough depths are sufficient to discard peaks that do not cross the zero line at all or where the signal does not go below zero at one side.

Figure 7:
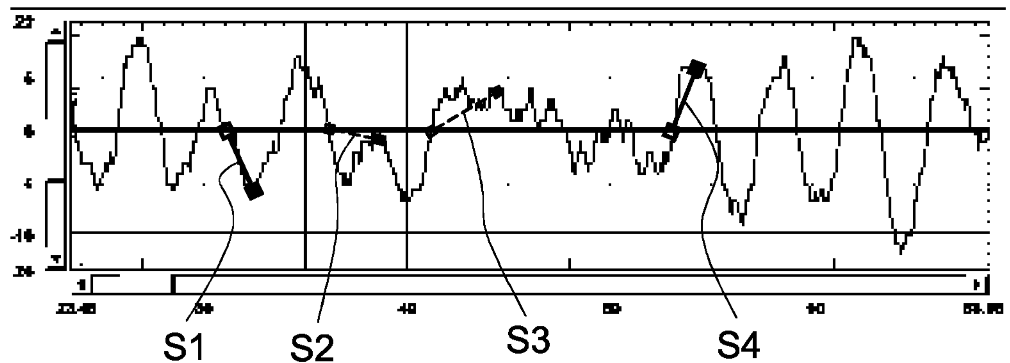
FIG. 7 illustrates a further method for discarding unreliable peak signals.

In order to even more safely avoid that peaks of the last mentioned type are accounted for, the invention proposes a further method for discarding low signal-to noise roller strains which can be applied as an alternative or in addition to the threshold values on the peak height or trough depths. As illustrated in FIG. 7, the absolute slope between a peak maximum and the zero crossing preceding the peak maximum or the slope of a line connecting the center and the preceding zero crossing are calculated and compared against the slope threshold. If the slope does not exceed the threshold, the peak or trough spacings related to the slope are discarded.

Further, the invention teaches to calculate a percentage confidence rating for each roller load induced strain measurement by comparing the number of successfully determined spacings per signal period against the number of rollers 10 per raceway. Where as1 and as2 are the FTFi angles of the first and the last successful spacing measurements, as $S_M$ the number of spacings measured and ZR the number of rollers 10 present then:

$$\text{Confidence }\%=(100\times360)(\alpha_{s2}-\alpha_{S1})*(S_M-1)/Z_R.$$

Figure 8:
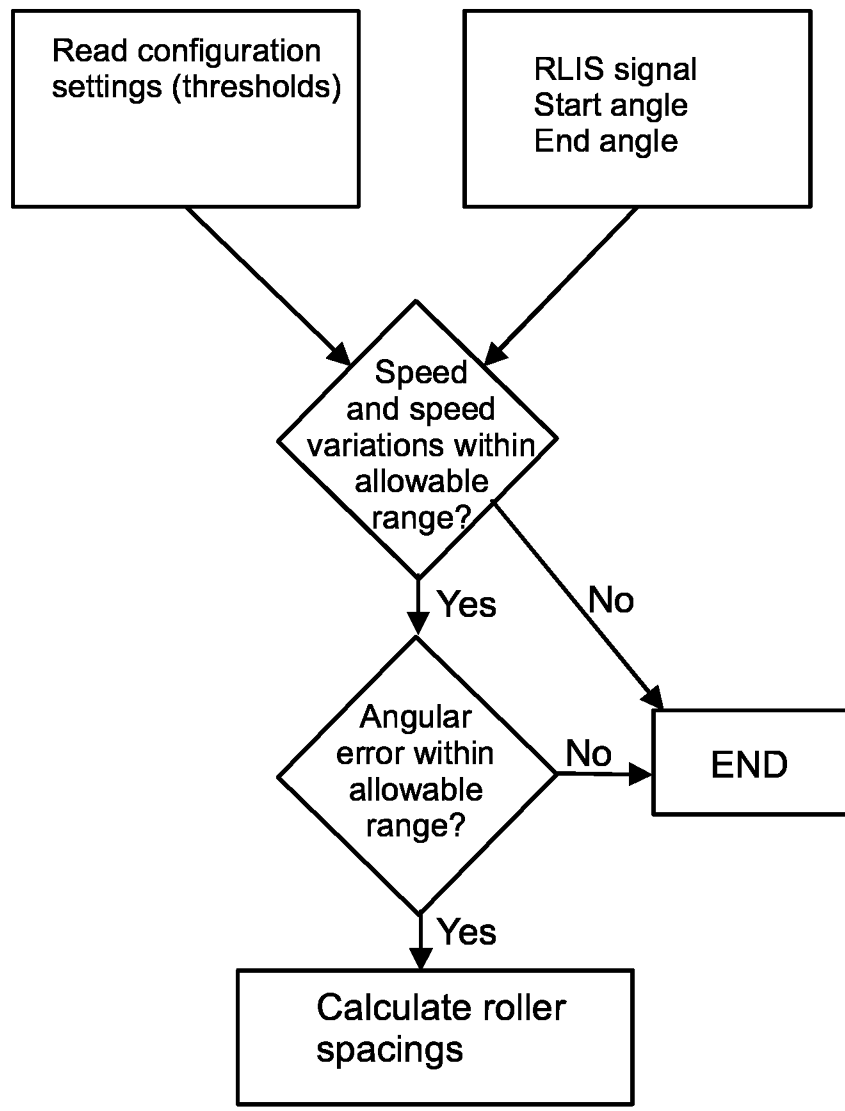
FIG. 8 is a flowchart of a first part of the method according to the invention, wherein a decision whether to carry out the determination of roller spacings.

FIG. 8 provides a flowchart of the decision process whether to carry out roller spacing assessment and the load distribution assessment based on a RLIS reading or not. The data processing device receives threshold values for the rotation speed and angle errors as well as the RLIS data including their start angle, end angle, start speed and end speed. It is checked whether the speed is within a certain band, having limited speed change between start and end of acquisition and that speed change is linear during the acquisition (i.e. not a ramp-up and ramp-down scenario).

It is presumed that any latency between the Start Angle measurement and start of acquisition and the end of acquisition and the End Angle measurement has already been compensated for in the node providing the start and end speeds. The data processing device calculates the theoretical end angle using the start angle, the start speed, the end speed and the time span of the RLIS waveform acquisition in seconds presuming a linear speed change and then calculates the difference to the end angle obtained from the node. If the angular error, i.e. the difference between theoretical end angle and actual end angle is greater than a pre-established threshold then the roller spacing algorithm should not be carried out. The raw RLIS signal can either be discarded or stored in the database for future reference.

Figure 9:
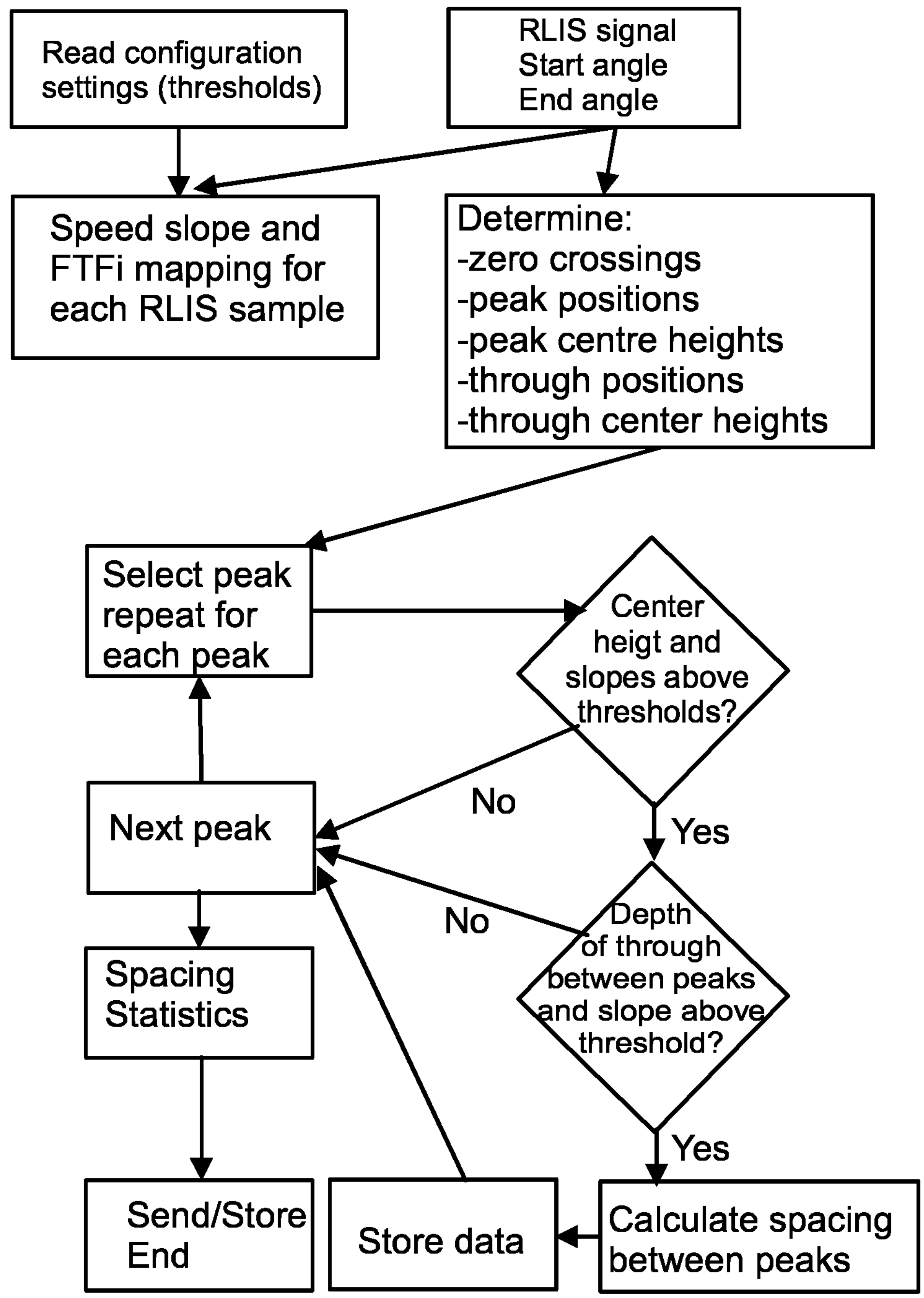
FIG. 9 is a flowchart of the roller spacing algorithm according to the invention.

FIG. 9 provides a high level flowchart of the "roller spacing" algorithm. The data and threshold values are input and the data are mapped on the FTFi period presuming a linear speed change as explained above. The zero crossings, peak positions, peak heights, trough positions and trough depths are then determined and stored in arrays respectively.

Then, a loop for checking the validity of each peak is started and it is checked whether the center heights of the peaks and the slopes of straight lines between the peak center and adjacent zero crossings are above the respective threshold values and whether the peaks are separated by a sufficiently deep trough. If two adjacent peaks are judged valid, the roller spacing is calculated as the difference between the peak positions and the roller spacing is stored. Then, the next peak is checked.

Finally, the confidence level is calculated and the spacing statistics are made to determine minimum spacing, maximum spacing, average spacing etc.

Figure 10:
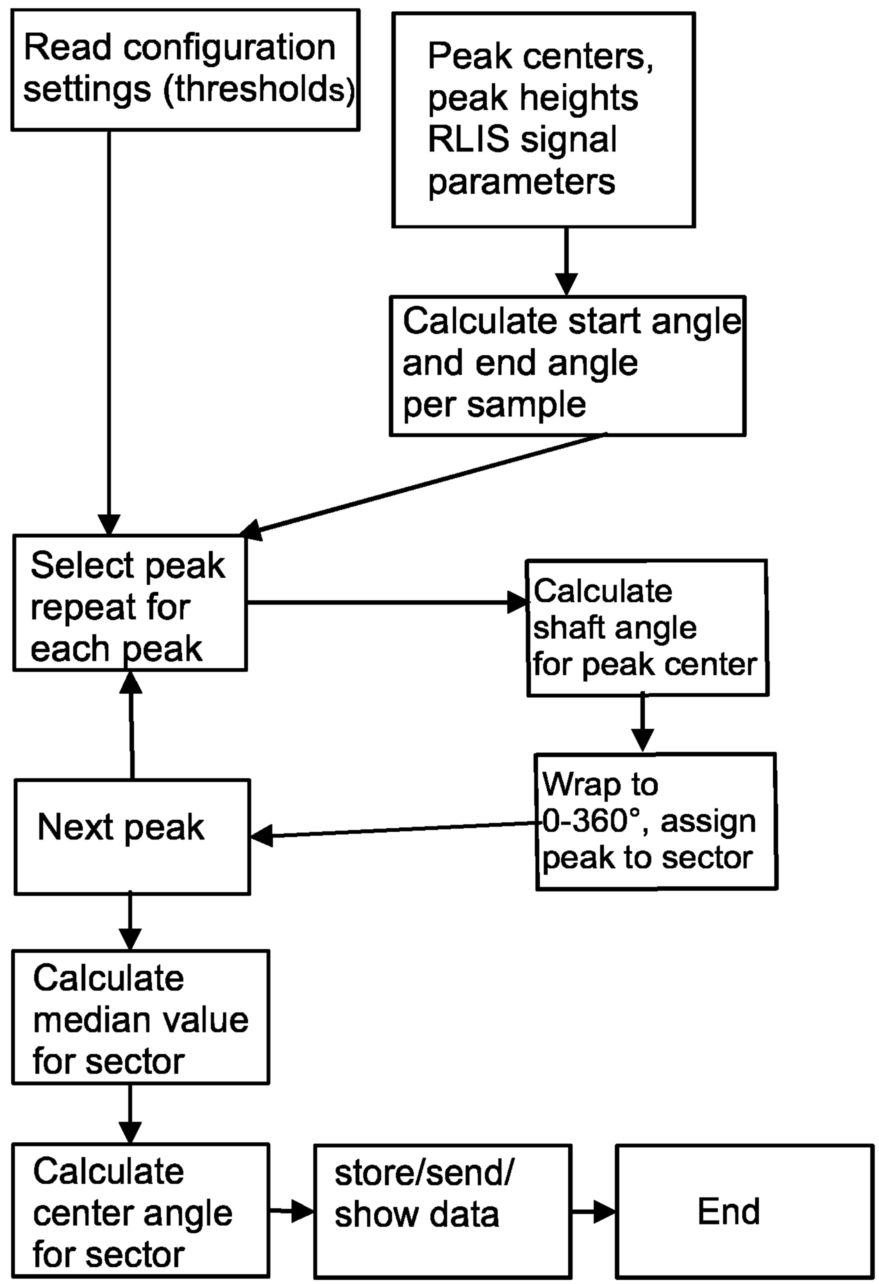
FIG. 10 is a flowchart of a load distribution algorithm according to the invention.

FIG. 10 is a flowchart of the load distribution algorithm according to the invention. The data processing device reads the configuration data including the number of sectors and the sector alignment from the settings. Here and in the following, the word "sector" is used synonymous with "angle range". The sector alignment indicates whether the top dead center of the inner ring or shaft is located in the center of a sector or at the boundary between two sectors or angular ranges.

Further, the data processing device reads the arrays of peak positions and peak heights calculated by the roller spacing algorithm as described above and the parameters of the data sets including time span of the RLIS sample, number of RLIS samples, initial and final speed and initial angle and calculates the start angle and end angle in terms of shaft degrees or inner ring degrees for each sample.

Then, the data processing device transforms the peak center positions into shaft angles and applies a correction accounting for the start angle and the sector alignment. Then, the angles are mapped or wrapped to a range from 0-360 degrees and the peaks are assigned to one of the sectors/angle ranges.

Figure 11:
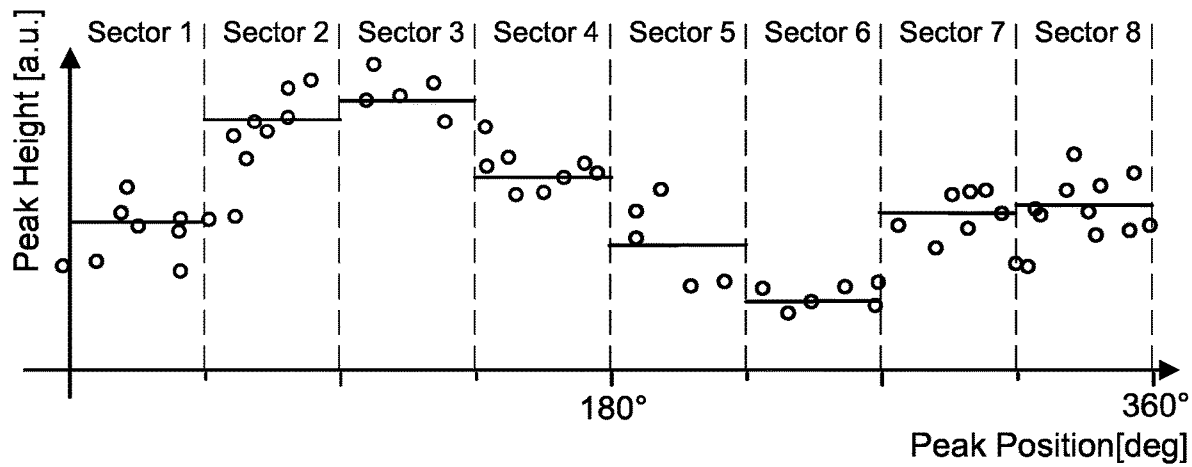
FIG. 11 is a data plot showing the peak heights and peak positions extracted from one of RLIS data sample after mapping the peak positions onto a range of shaft angles from 0 tp 360°.

The result of this mapping is illustrated in FIG. 11, which is s a data plot showing the peak heights and peak positions extracted from one of RLIS data sample after mapping the peak positions onto a range of shaft angles from 0 to 360°. Although the data are scattered, it is clearly visible that the load concentrates onto some of the sectors, in the example of FIG. 11 onto sectors 2 and 3. Each of the individual data points illustrated as open circles corresponds to one valid peak position (x-axis) and pertinent peak height (y-axis). The median values of the data points per sector are illustrated as solid black lines.

Figure 12:
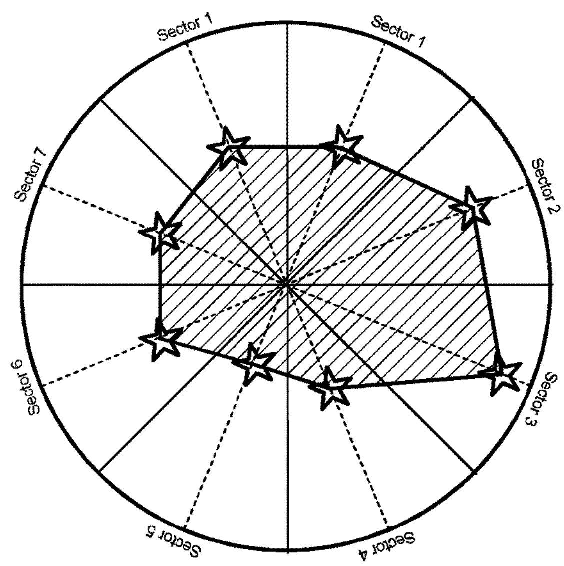
FIG. 12 is a circular plot illustrating the median values of the peak heights per sector derived from the data illustrated in FIG. 11.

Once all the peaks are assigned to one of the sectors, a median value of the peak heights and a center angle of the sector are calculated. An array with the median values and the center angles is stored, sent or displayed, e.g. in the form of a circular plot as shown in FIG. 12, wherein the median values of the data points per sector are illustrated as solid black lines. The center angles of the sectors are illustrated as dashed lines.

The roller load distribution algorithm is not limited to using the peak positions and peak heights calculated by the roller spacing algorithm but could determine the peak positions and peak heights in an independent way in other embodiments of the invention. For example, the requirement of minimum slopes as described above in relation to FIG. 7 could be dispensed with when determining the load distribution.

What is claimed is:

1. A method for detecting a load distribution in a roller bearing comprising at least one row of rollers, a first ring, a second ring, a data processing device, and a strain sensor, the first ring rotating relative to the second ring, the strain sensor being attached to the first ring, the method executed by the data processing device, the method comprises:

filtering, by the data processing device, a plurality of roller load induced strain signals obtained from the strain sensor to avoid distortions and to include a roller pass frequency and at least one or more harmonics thereof;

detecting, by the data processing device, peak heights and peak positions in the plurality of roller load induced strain signals;

determining, by the data processing device, values of the load distribution for a plurality of sectors of equal size covering the entire circumference of the second ring, the plurality of sectors comprising eight sectors of 45 degrees each, the values being based on a load acting on at least one angle range of the second ring and a median value of the peak heights in the at least one angle range using the peak heights of a plurality of peak positions falling in the at least one angle range, the median value being immune to amplitudes of the plurality of roller load induced strain signals caused by increased and decreased spacings;

discarding of the plurality of roller load induced strain signals which both: (1) have a signal-to-noise-ratio less than or equal to sixty percent (60%); and (2) which are in a range of between one half of the fundamental ball pass frequency and twice the fundamental ball pass frequency;

and calculating a percentage confidence rating for each roller load induced strain signals.

2. The method according to claim 1, further including a step of outputting an array containing the median values calculated for each of the plurality of sectors of the second ring.

3. The method according to claim 1, further including:

filtering the strain signal utilizing a high pass or band pass filtering;

determining zero crossings of the high-pass filtered strain signal;

determining a peak position as a midpoint between adjacent zero crossings of the signals; and determining a peak height using the roller load induced strain signal at the peak position.

4. The method according to claim 3, further including steps of:

determining peak heights and peak positions of peaks of the strain signal;

determining trough depths and trough positions of troughs in the strain signal;

comparing the peak heights and trough depths with predetermined threshold values respectively; and making use of the peak heights in the step of determining the load distribution only when the pertinent peak height and the trough depth between a peak and its neighboring peak are below the respective threshold values.

5. The method according to claim 1, further comprising a step of:

determining the slope of a linear function connecting the zero crossing point and the peak height of the peak following the zero crossing point and discarding the peak for the purpose of determining the load distribution if the slope falls short of a predetermined minimum slope.

6. The method according to claim 1, further comprises a step of:

mapping the roller load induced strain signals onto angle dependent signals relating to angular positions on the second ring.

7. A data processing device for detecting a load distribution in a roller bearing comprising at least one row of rollers, a first ring, a second ring, and a strain sensor, the data processing device comprising:

at least one interface for receiving roller load induced strain signals from the strain sensor being attached to the first ring, the data processing device configured to implement:

filtering, by the data processing device, the roller load induced strain signal to avoid distortions and to include discarding of a plurality of roller load induced strain signals which both: (1) have a signal-to-noise-ratio less than or equal to sixty percent (60%); and (2) which are in a range of between one half of the fundamental ball pass frequency and twice the fundamental ball pass frequency;

detecting peak heights and peak positions in the roller load induced strain signals;

and determining values of the load distribution for a plurality of sectors of equal size covering the entire circumference of the second ring, the values being based on a load acting on at least one angle range of the second ring and a median value of the peak heights in the at least one angle range using the peak heights of a plurality of peak positions falling in the at least one angle range, the plurality of sectors comprising eight sectors of 45 degrees each, the median value being immune to amplitudes of the roller load induced strain signals caused by increased and decreased spacings.

8. The data processing device according to claim 7, further including a wireless transmitter configured to be attached to a roller bearing.

9. The data processing device according to claim 7, further comprising a roller bearing equipped with at least one strain sensor for capturing roller load induced strain signals, wherein the roller bearing is equipped with the data processing device.

10. The method of claim 1, wherein the step of discarding of the plurality of roller load induced strain signals further comprises discarding of the plurality of roller load induced strain signals which both: (1) have a signal-to-noise-ratio less than or equal to sixty percent (60%); and (2) which are in a range of between one half of the fundamental ball pass frequency and twice the fundamental ball pass frequency.

11. The method of claim 1, wherein the percentage confidence rating equals:

Confidence% $=(100 \times 360) / (\alpha_{s2} - \alpha_{s1}) * (S_M - 1) / Z_R$ wherein:

$\alpha_{s1}$ is an FTFi angle of a first successful spacing measurement;

$\alpha_{s2}$ is an FTFi angle of a last successful spacing measurement;

$S_M$ is a number of spacings measured; and $Z_R$ is number of rollers present.

* * * * *